Figure 5:
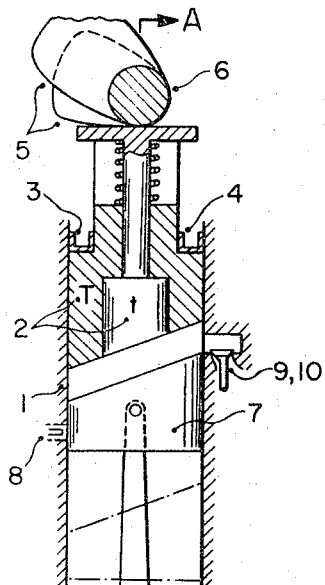

April 4, 1967  D. RADOVIC  3,312,206
RECIPROCATING ENGINES
Filed Dec. 9, 1964  2 Sheets-Sheet 1
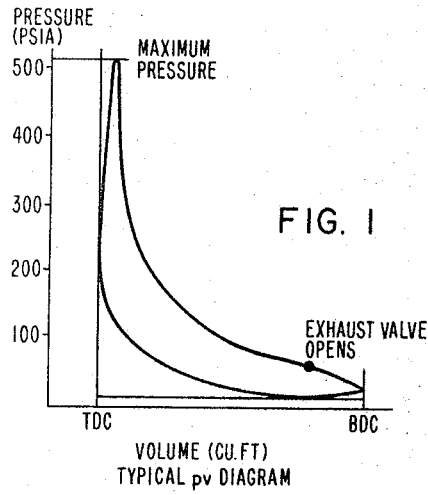
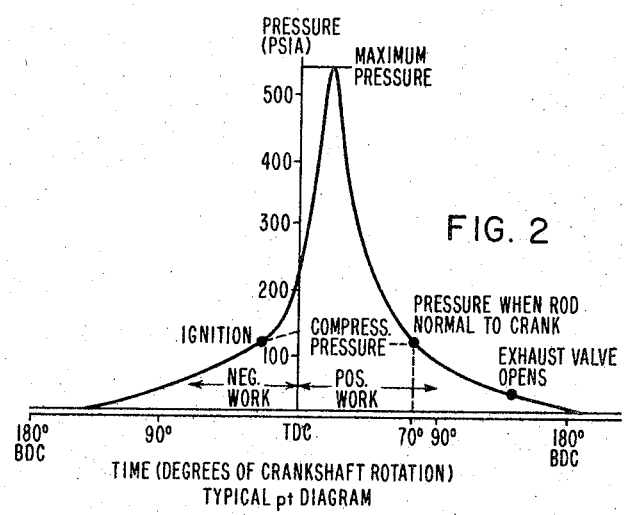
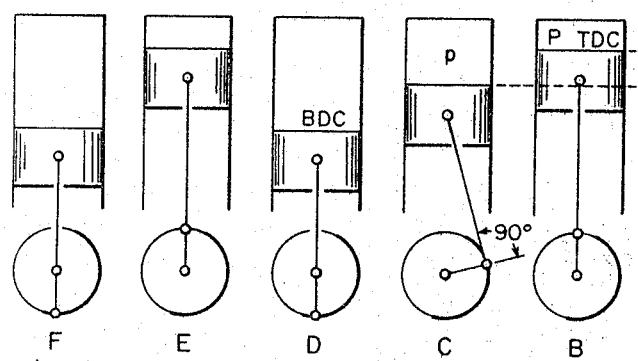
FIG. 3
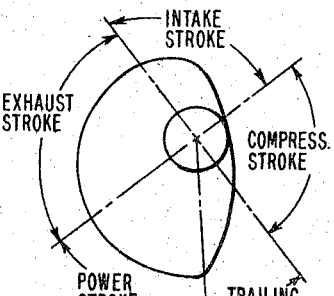
FIG. 4a
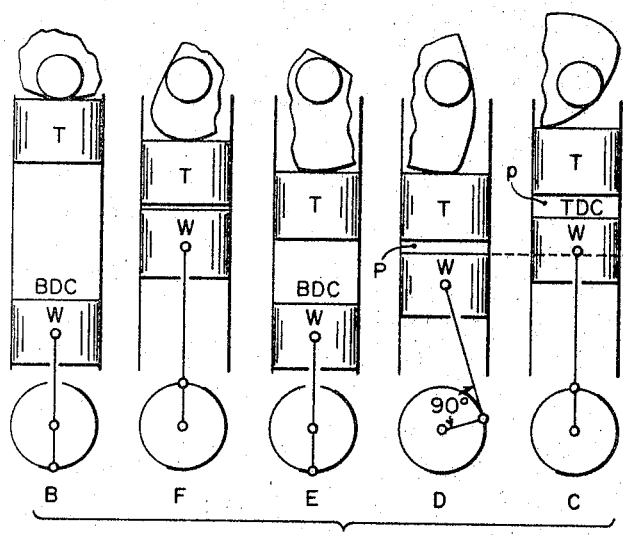
FIG. 4
INVENTOR.
D. Radovic April 4, 1967 D. RADOVIC 3,312,206
RECIPROCATING ENGINES
Filed Dec. 9, 1964 2 Sheets-Sheet 2

SEC. A-A

SEC. B-B

SEC. C-C

INVENTOR.
D. Radovic

United States Patent Office 3,312,206
Patented Apr. 4, 1967

3,312,206
RECIPROCATING ENGINES
Dusan Radovic, 1111 Stephen St., Apt. 50,
San Bernardino, Calif. 70053
Filed Dec. 9, 1964, Ser. No. 417,026
1 Claim. (Cl. 123—78)

My invention relates to improvements in reciprocating engines of all types.

The main object of the invention is the increase of power output and general increase of efficiency of reciprocating engines, by a relatively simple mechanical arrangement embodying the synchronization of maximum pressure on the piston head with the maximum leverage, to produce maximum possible torque.

The said arrangement in a reciprocating engine includes a cam actuated auxiliary piston above the conventional working piston. It may include also a small compression piston within the auxiliary piston to maintain the compressed volume of fluid mixture constant during the combustion which is not instantaneous in internal combustion engines, the said arrangement allowing also for increased intake volume, increased compression, improved exhaust scavenging, reduced wear and vibration.

The typical pressure-volume diagram, FIG. 1, and pressure-time diagram, FIG. 2, show the rapid decrease of pressure during the working stroke in conventional internal combustion reciprocating engines.

FIG. 3 schematically shows the pressure-volume diagram, A, and the relative positions of the piston in a four stroke, conventional internal combustion engine.

The pressure-volume diagram shows: 1–2 intake and stroke length from TDC to BDC, 2–3 compression, 3–4 ignition-combustion, 4–5 expansion or working stroke, 5–2 release.

FIG. 3, B, shows the piston at TDC, at the end of the compression stroke; FIG. 3, D, at the end of the power stroke; FIG. 3, C, shows the piston in an intermediate position of the power stroke, at maximum leverage, but with considerably reduced pressure on the piston head in the area of maximum leverage.

FIG. 3, E, shows the piston at the end of subsequent exhaust stroke, and FIG. 3, F, at the end of the intake stroke.

This classical arrangement of internal combustion engines and the typical diagrams shown on FIG. 1 and FIG. 2 demonstrate graphically rapid decrease of pressure on piston head and simultaneous increase of leverage resulting in a weak torque and very low engine efficiency.

The schematic embodiment of my invention is shown on FIG. 4.

FIG. 4, A, shows the relevant pressure-time diagram: 1–2 intake and stroke length from TDC to BDC, 2–3 preliminary compression, 3–4 final compression, 4–5 ignition-combustion and maximum fluid pressure P, 5–6 expansion or working stroke, 6–2 release.

The simplicity and feasibility of the new arrangement is shown in the addition of an auxiliary piston T, in relative positions to the working piston W, as shown in FIG. 4. The said piston T is actuated by a cam, FIG. 4a; the camshaft is driven by appropriate means (not shown) by the drive shaft of the engine. These means may be similar to the driving arrangement of camshaft actuating the valves.

FIG. 4, D, shows that both pistons have moved downward, achieving higher compression and maximum pressure P at the end of the combustion. The connecting rod is normal to the lever-arm and considerably higher torque is produced than in conventional existing reciprocating engines.

The auxiliary piston T is stopped slightly prior to complete combustion, maintaining high compression in the area of maximum leverage, during the combustion in the optimum thermodynamic conditions. There is no counter-torque as in conventional spark-ignited internal combustion engines.

The auxiliary piston T remains stationary until the end of the power stroke, as shown in FIG. 4, E.

At the start of the exhaust stroke, the auxiliary piston T moves to a position just above the TDC of the working piston W, thus achieving complete evacuation of burnt gases from the cylinder. This is shown on FIG. 4, F.

At the start of the intake stroke the auxiliary piston T moves to its extreme top position, which is higher than that shown on FIG. 4, C. Thus, the intake volume is increased. This is shown on FIG. 4, B; the cycle is then repeated as before.

In order to enable any person skilled in the art or science of reciprocating engines to make and use my invention, a practical example of mechanical embodiment is shown in FIG. 5 and its sec. A—A in FIG. 8.

Other arrangements are possible without departing from the intent and principle of my invention.

Mechanisms and various types of reciprocating engines are universally known and widely exhibited. Therefore only the essential components of my arrangement are shown.

It can be assumed that the head is removed from an existing conventional reciprocating engine, which has its valves installed laterally.

Let us assume that the engine has a longer cylinder 1, to accommodate an auxiliary piston 2, the upward movement of the said piston limited by a retaining ring 3, the said movement guided by a guiding ring 4. Rings 3 and 4 are suitably affixed to the cylinder. The piston 2 is held against two lateral cams 5, by two springs, shown in FIG. 8, sec. A—A. The cams are actuated by a camshaft 6, driven from the crankshaft. The driving mechanism may be similar to existing valve camshaft mechanisms, such as chain, crank gear, toothed wheels, or the like. The working piston is designated by 7, the sparkplug by 8, and the valves by 9 and 10 respectively.

Figure 8:
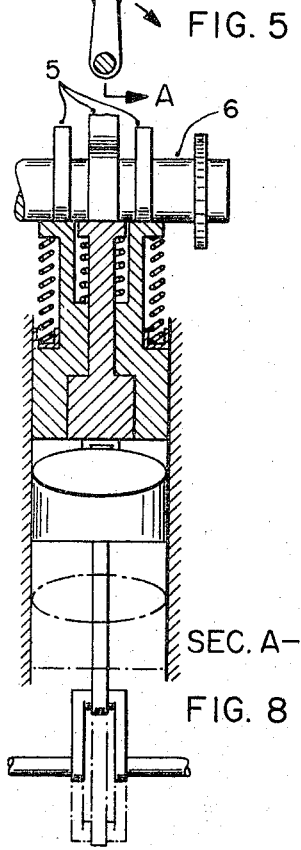

The small compression piston $t$, is held against the central, thicker cam by the central spring, as shown on FIG. 5 and FIG. 8, sec. A—A. The said piston $t$, when its spring is compressed or decompressed slides inside the auxiliary piston 2.

FIG. 5 shows the working piston 7 in top dead center position at the end of the preliminary compression, and the two added pistons 2 and $t$ in their top position.

Figure 6:
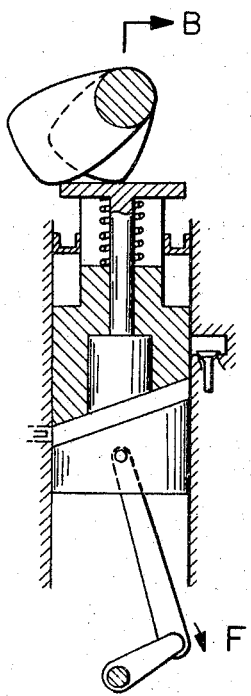
Figure 9:
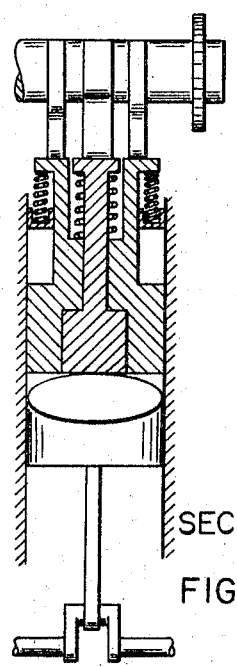

FIG. 6 shows the three pistons 7, 2 and $t$ in a position when ignition/combustion is started and the connecting rod is approaching perpendicularity to the crank-arm. At that instant the auxiliary piston is stopped and the working piston continues its high velocity outward travel. FIG. 9 shows sec. B—B of FIG. 6.

Even though the compressed fuel-air mixture burns very rapidly, almost explosively, it does take some time for the mixture to burn out and the pressure increase to take place. The advantage of high compression at the start of combustion is partially lost and the pressure increase cannot keep pace with the rapid outward travel of the working piston.

In order to take advantage of high initial compression in keeping the compression volume constant during the combustion, the small piston $t$ trails the working piston for a short time. During that time combustion is completed, perpendicularity achieved and maximum possible torque produced.

During the sweep of the connecting rod crank assembly through the area of perpendicularity considerably more of useful work (power) is produced than in any known conventional reciprocating engine.

Figure 7:
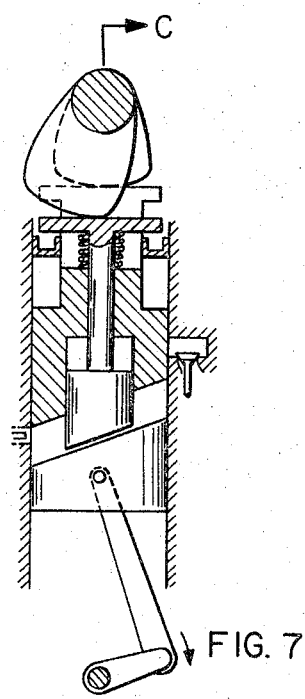
Figure 10:
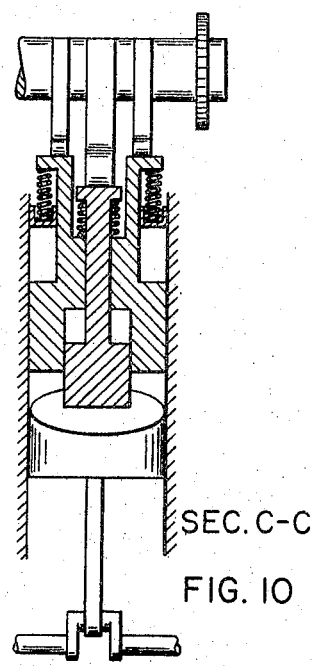

FIG. 7 shows the small piston $t$ stopped at the instant of maximum torque, and the working piston with connecting rod continuing its travel through the area of maximum leverage and maximum productive work. FIG. 10 shows sec. C—C of FIG. 7.

At the instant of maximum torque production, the small piston $t$ is stopped and remains stationary until the end of the working stroke.

At the end of the working stroke, the small piston $t$ reenters piston 2 and they move up together to a position where the working piston will almost contact them to achieve complete scavenging of burnt gases from the cylinder.

Intake stroke and compression stroke are the same as described and shown on FIG. 4, B and C.

FIG. 5 and FIG. 8, sec. A—A show a slanted compression/combustion chamber in the cylinder, bounded by slanted pistons 7, 2 and $t$.

The purpose of the slanting is to deflect the most of the produced pressure into the longitudinal stress of the connecting rod, while the crank is sweeping the area of maximum leverage. Another effect of the slanting during that time is the reduction of the side-thrust of the working piston.

By changing the cam profile the compression ratio can be modified. By changing the cam profile there is also a possibility to increase the outward travel of the auxiliary piston in order to increase the intake volume in the cylinder.

These advantages do not exist in conventional reciprocating engines.

What I claim is:

In a reciprocating engine, a cylinder or plurality of cylinders having lateral intake and exhaust ports, a crankshaft, a valve operating camshaft, a working reciprocating piston in said cylinder, the said assembly including an auxiliary piston held against its cam by means of a spring or springs, said cam actuated by a camshaft driven from the crankshaft, the travel of said auxiliary piston in relation to the travel of the working piston timed suitably as:

to keep the volume of the compression chamber reduced up to the end of the combustion, at the instant when the connecting rod of working piston is normal to the lever-arm;

to stop the said auxiliary piston from the instant of that normality until the end of the working stroke;

to reduce almost to zero the volume in the cylinder between the working piston and auxiliary piston at the end of the exhaust stroke;

to increase the intake volume, and wherein said engine includes a small compression piston within the auxiliary piston, the said small compression piston held against its cam by means of a spring, the said cam actuated by the same camshaft as the auxiliary piston, the travel of the said compression piston timed suitably as:

to protrude from auxiliary piston into the combustion chamber from the instant of ignition to the instant of completed combustion;

to stop at the instant of completed combustion and maximum built-up pressure and remain stationary until the end of the working stroke;

to re-enter the auxiliary piston at the start of the exhaust stroke;

to stay inside the auxiliary piston until the ignition during the next cycle;

to keep effectively the volume of the combustion chamber constant until the connecting rod of the working piston is normal to the lever-arm, and thus produce maximum possible torque.

References Cited by the Examiner

UNITED STATES PATENTS

| | | | |
|---|---|---|---|
| 1,135,942 | 4/1915 | Logan | 123—48 |
| 1,284,190 | 11/1918 | Hall | 123—75 |
| 1,309,891 | 7/1919 | Griffith | 123—78 |
| 1,848,597 | 3/1932 | Arnold | 123—78 |
| 2,194,022 | 3/1940 | Kitzeman | 123—78 |

FOREIGN PATENTS

| | | |
|---|---|---|
| 102,852 | 1/1917 | Great Britain. |
| 562,678 | 3/1933 | Germany. |

MARK NEWMAN, *Primary Examiner.*

WENDELL E. BURNS, *Examiner.*

UNITED STATES PATENT OFFICE
CERTIFICATE OF CORRECTION

Patent No. 3,312,206                                    April 4, 1967

Dusan Radovic

It is certified that error appears in the above identified patent and that said Letters Patent are hereby corrected as shown below:

In the heading to the printed specification, line 4, "San Bernardino, Calif." should read -- Gretna, La. --.

Signed and sealed this 5th day of August 1969.

(SEAL)
Attest:

Edward M. Fletcher, Jr.                      WILLIAM E. SCHUYLER, JR.
Attesting Officer                                  Commissioner of Patents